UNITED STATES PATENT OFFICE.

JOHANNES H. H. O. GÜRKE, OF HÖCHST-ON-THE-MAIN, GERMANY, ASSIGNOR TO FARBWERKE, VORMALS MEISTER, LUCIUS & BRÜNING, OF SAME PLACE.

PRODUCTION OF SOLUBLE ALIZARINE-BLUE COLOR.

SPECIFICATION forming part of Letters Patent No. 261,600, dated July 25, 1882.

Application filed March 1, 1882. (No specimens.) Patented in England February 9, 1882, No. 627.

*To all whom it may concern:*

Be it known that I, JOHANNES HEINRICH HERMANN OSKAR GÜRKE, of Höchst-on-the-Main, Germany, have invented certain new and useful Improvements in Coloring-Matters; and I do hereby declare that the following is a full, clear, and exact description of the invention, which will enable others skilled in the art to which it appertains to make and use the same.

My invention relates to an improvement in coloring-matter produced from alizarine; and it has for its object the conversion of alizarine blue—viz., the compound produced from nitro-alizarine by heating the same with glycerine and sulphuric acid, the formula of which is $C_{17}H_9NO_4$—into a compound, soluble in water, by means of the neutral sulphite of ammonia, $(NH_4)_2SO_3$.

Alizarine in the form of a paste of ten per cent. coloring-matter, or an alkaline salt of the same, I mix thoroughly with a concentrated solution of neutral sulphite of ammonia. This mixture I expose for several days to a temperature of 86° to 104° Fahrenheit, (30° to 40° centigrade,) after which time the greater part of the alizarine blue will have been dissolved and the liquid will have become of a dark-yellow color. I now filter this solution, and the new compound of alizarine blue, soluble in water, is precipitated by an addition of common salt.

Having thus described my invention, what I claim as new, and desire to secure by Letters Patent, is—

The dark-yellow coloring-matter produced by the reaction of sulphite of ammonia upon the coloring-matter known as "commercial alizarine blue," substantially as herein set forth.

In testimony that I claim the foregoing as my own I have affixed my signature in presence of two witnesses.

JOHANNES HEINRICH HERMANN OSKAR GÜRKE.

Witnesses:
    JOSEPH EUGEN REVERDY,
    ALBERT FRÖSCHMANN.